United States Patent [19]

Cannon

[11] 4,122,299
[45] Oct. 24, 1978

[54] DATA OUTPUT FORMAT MODIFYING SYSTEM

[75] Inventor: Robert S. Cannon, Jupiter, Fla.

[73] Assignee: Palm Beach Cable Television Company, Palm Beach Gardens, Fla.

[21] Appl. No.: 766,707

[22] Filed: Feb. 8, 1977

[51] Int. Cl.² .................. H04L 17/00; H04N 7/18
[52] U.S. Cl. ...................... 178/26 A; 178/2 B; 358/86; 358/141
[58] Field of Search .......... 358/141, 86; 178/2 B, 178/26 A; 340/347 DD

[56] References Cited
U.S. PATENT DOCUMENTS

| | | | |
|---|---|---|---|
| 3,836,888 | 9/1974 | Boenke | 358/86 |
| 4,042,958 | 8/1977 | Saylor | 358/141 |

*Primary Examiner*—Howard W. Britton
*Attorney, Agent, or Firm*—Spencer & Kaye

[57] ABSTRACT

A system for placing data in a format for acceptance by a general purpose communications printer, the data originally being in a format for providing a television display to news wire service subscribers, and being originally in a format composed of signals representing a succession of characters. The data is temporarily stored and then read out in segments each containing signals representing the number of characters per line in the printer output, printer control signals are inserted between segments, and the resulting composite signal is then conducted to the printer locations, where it is placed in a form which can be applied to a printer.

11 Claims, 13 Drawing Figures

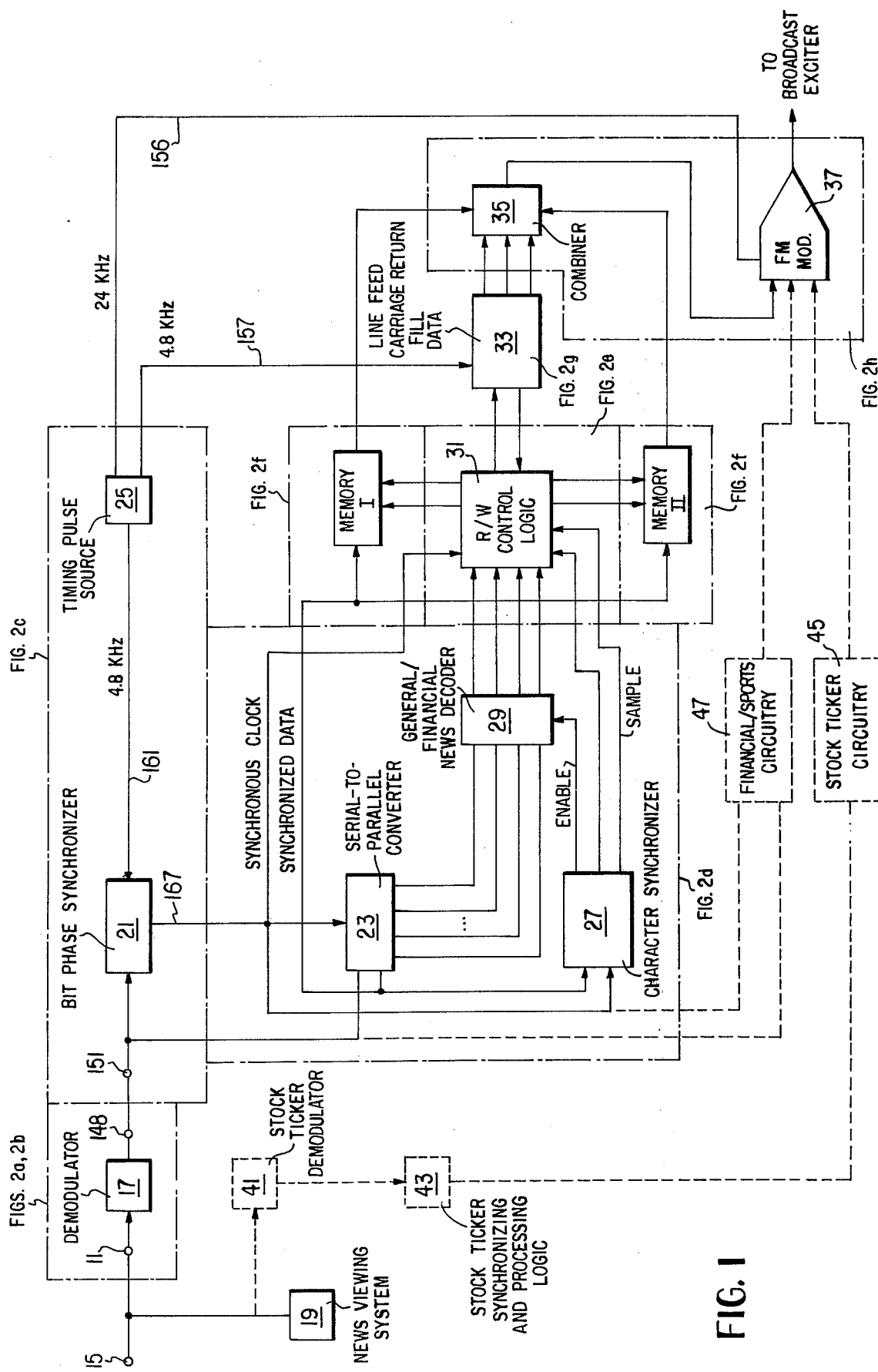

DATA OUTPUT FORMAT MODIFYING SYSTEM

BACKGROUND OF THE INVENTION

The present invention relates to data transmission systems, particularly of the type employed by news-wire services.

Currently, there are a number of news-wire services that offer news data in formats for various types of read-out. For example, it is possible to subscribe to a service which delivers signals to a communications printer, or to a service providing signals for application to a TV screen. Signals in the latter form are distributed, for example, by CATV systems, which receive news-wire service signals at the head-end antenna site and then transmit them, via a closed circuit cable television network, to subscribers equipped with television display terminals.

SUMMARY OF THE INVENTION

It is an object of the present invention to generate, from news service signals formatted for a television display, signals in a format for application to a communications printer.

A further object of the invention is to transmit such reformatted signals together with the original signals intended for TV display, in order to permit a subscriber to effect print-out of selected news items.

These and other objects are achieved according to the invention by providing a data adapter member which is connected to receive a stream of television display formatted signals and which includes a signal storage unit to temporarily store successive portions of this signal stream, a control signal generating unit which generates the signals required to instruct a communications printer to begin a new line of character print-out, and a control unit for providing a signal output stream composed of successive segments of each signal stream portion, each segment containing signals representing the number of characters to be printed on a single line in the print-out, and in the intervals between successive segments, the signals required to instruct the printer to begin a new line, and by providing a printer controller member associated with such printer and receiving the signal output stream and supplying the information contained therein to such printer.

BRIEF DESCRIPTION OF THE DRAWINGS

FIG. 1 is a block circuit diagram of a preferred embodiment of a data adapter member of a system according to the invention.

DESCRIPTION OF THE PREFERRED EMBODIMENTS

Figure 2A:
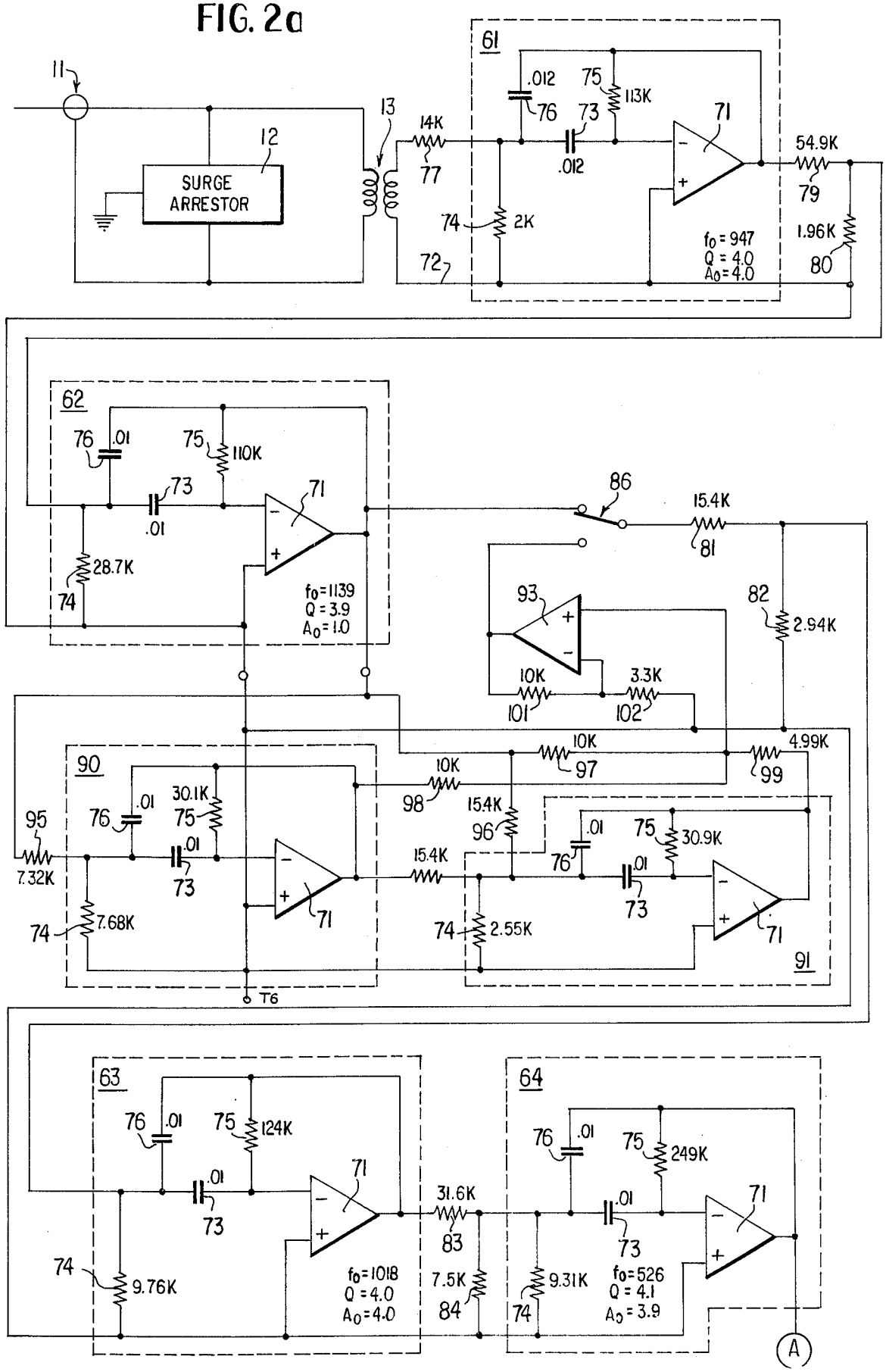
FIGS. 2a–2h are circuit diagrams of preferred embodiments of circuit units in the member of FIG. 1.

A system according to the invention is composed essentially of a data adapter at the CATV main receiving antenna location and, at each subscriber location, a printer controller associated with the printer at that location. The data adapter is connected to receive the data transmitted by a news-wire service, which is transmitted via a special telephone line, and converts this into a signal which can be transmitted over a closed circuit cable television network. The signal transmitted over this network is delivered to the printer controller, which converts it into a sequence of binary pulses suitable for controlling the printer at the subscriber location. This enables a printer to duplicate the data which was originally intended only to provide a display on a television monitor.

Additionally, the printer controller can be constructed to select, for printing, data from any one of a number of channels, in those systems in which several news-wire service channels are available. The printer controller can also be arranged to select only certain entries to be printed, particularly in the case when the service provides repetitive tabular listings.

The data adapter performs two primary functions, which are: to insert printer "line feed" and "carriage return" command signals at appropriate locations in the data stream; and to convert the data provided by the news-wire service into a form which can be distributed over the CATV network. One preferred embodiment of a data adapter according to the invention is shown in block form in FIG. 1. This circuit includes a demodulator 17 having its input connected at terminal 15 to a special telephone line carrying the newswire service signals.

A news-wire service ordinarily provides digital signals representing alphanumeric characters, each character being represented by a ten bit signal composed of a start bit, seven data bits, a parity, or check bit and a stop bit. The binary signals are supplied to the special telephone line in frequency multiplexed form.

For example, news transmitted by Reuters News Service is constituted by a 1,080 Hz carrier frequency modulated to vary its frequency by ±120 Hz depending on the binary value of each information bit. The news service may also transmit, over the special telephone line, stock ticker information, also composed of binary words, transmitted for example, in the form of a similarly frequency modulated 720 Hz carrier.

The news signals transmitted to terminal 15 can be conducted to a news viewing system 19 including a television monitor and normally provided at the receiving antenna site for the purpose of monitoring the incoming information.

The demodulator 17 separates the news information modulated onto the 1,080 Hz carrier from such stock ticker information, and any other information supplied to terminal 15, and then demodulates the news signal to recreate the original sequence of binary "ones" and "zeros" constituting the information characters, as well as various identifying information.

The bit stream includes general news and financial/sports news which are transmitted in a time-multiplexed manner, a predetermined number of characters of general news alternating with a predetermined, usually equal, number of characters of financial/sports news.

The output signals from demodulator 17 are conducted to the input of a bit phase synchronizer 21, the input of a serial-to-parallel converter 23, and the data inputs of two memories, designated as memory I and memory II. The operation of bit phase synchronizer 21 is controlled by timing pulses produced by a source 25, which preferably includes a stable crystal oscillator.

The output signal from synchronizer 21 is delivered both to a control input of converter 23 and to a control input of a character synchronizer 27 whose output delivers an "enable" signal to a control input of a general/financial news decoder 29. Decoder 29 identifies each sequence of general news characters and supplies a recognition signal to a read/write control logic 31 to trigger the delivery of one such sequence to a selected one of memories I and II.

Successive sequences of general news characters are delivered to alternate ones of the memories I and II, while the sequences of financial/sports news characters intervening between successive general news character sequences are lost. Each of memories I and II has a capacity to store all of the characters of a single general news character sequence.

In order to insert necessary printer commands, controlling, for example, line feed, carriage return and fill data, which commands are not necessary for the TV display disposed at each subscriber location, there is provided a signal generator 33 which locally generates the necessary bit sequences.

At selected intervals, the data stored in each of the memories I and II is delivered to a combiner 35, together with properly timed signals from generator 33, and the resulting data stream is delivered to one input of an FM modulator 37 which frequency modulates the binary data stream to convert each binary "1" into a 6 KHz pulse and each binary "0" into a 12 KHz pulse, the output from modulator 37 being conducted to a broadcast exciter which frequency modulates an 88.7 MHz carrier with the resulting output from modulator 37.

As is also shown in FIG. 1, the illustrated system can be completed to additionally transmit the financial/sport data and stock ticker data. For this purpose, the system would be completed by a stock ticker demodulator 41 connected to input terminal 15, and a stock ticker synchronizing and processing logic 43 which processes the binary stock ticker data in a manner similar to that described above for the general news data. The output of logic 43 is then conducted to suitable stock ticker circuitry 45 which inserts the necessary printer control signals and produces a combined signal that can also be applied to FM modulator 37. In addition, financial/sports news circuitry 47 can be constructed in a manner similar to that described above for the general news circuitry to provide a stream of binary data that is applied to modulator 37. However, only the system for processing the general news information will be described in detail herein, it being understood that the additional circuitry shown in FIG. 1 can be designed in a similar manner.

One specific operative circuit embodiment of the system of FIG. 1 is illustrated in FIGS. 2a to 2h.

Figure 2B:
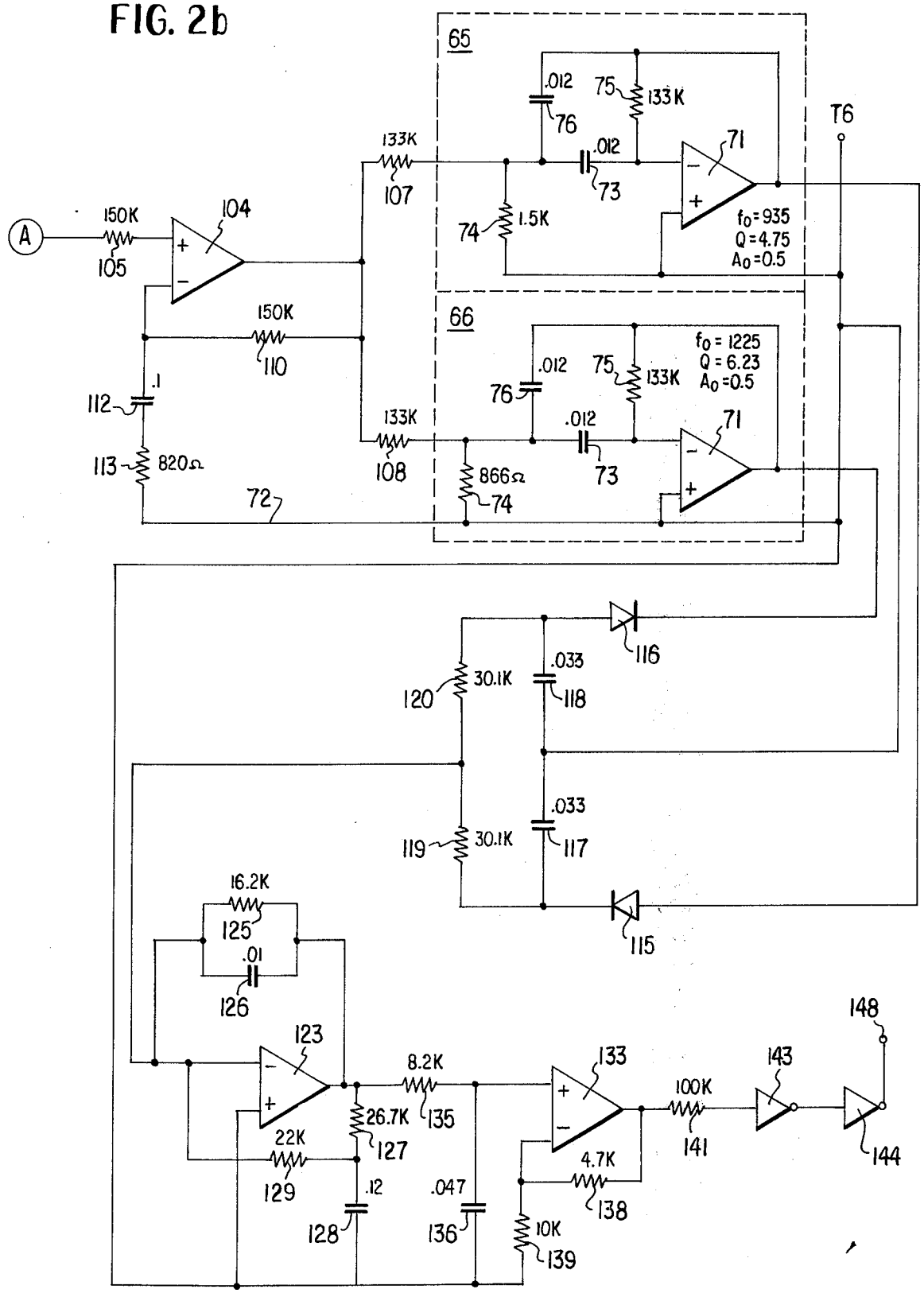

An embodiment of demodulator 17 is shown in FIGS. 2a and 2b. This is designed to demodulate the signals appearing in the Reuters News Service Data Format on channel 2 of a GTE-Lenkurt Model 25C signal modulator. The demodulator input is connected to the telephone line via a jack 11 across the contacts of which there are connected a surge arrestor 12 and the primary winding of a coupling transformer 13, which may be a Stancor Model TA-52 transformer having a 1:1 transformation ratio.

Connected to the secondary of transformer 13 is a series of four second order resonators, or bandpass filters, 61, 62, 63 and 64. The center frequency, $f_o$, Q value, and mid-band gain, $A_o$, of each resonator are indicated on the drawing, as are suitable values for all passive components.

Each of resonators 61–64 is composed of a high gain differential amplifier, for example an operational amplifier, 71 having its noninverting input connected to the circuit common line 72. The inverting input of each amplifier 71 is connected to the signal input for its associated resonator via a capacitor 73. An input resistor 74 is connected in shunt between the resonator signal input and the circuit common line 72. Each resonator further includes a resistor 75 connected in feedback between the output and the inverting input of amplifier 71, and a capacitor 76 connected in feedback between the amplifier output and the resonator signal input. The amplifier output provides the signal output for the resonator.

The signal input of resonator 61 is connected to the secondary of transformer 13 via a coupling resistor 77, while resonators 61, 62, 63 and 64 are coupled in series by respective series-shunt resistor couplers 79, 80; 81, 82; and 83, 84. In addition, resonators 62 and 63 are coupled by a single pole, double throw switch 86 and by a switchable compromise delay equalizer which can be connected in series between resonators 62 and 63 by moving switching 86 to the switching position opposite that shown. The equalizer is employed during reception in a channel having degraded characteristics such that data transmission becomes difficult.

The delay equalizer includes two further bandpass filter stages 90 and 91 each constituted by a circuit similar to each of resonators 61–64, and a further differential amplifier 93 whose output is connected to the other switchable contact of switch 86.

The output of resonator 62 is connected to the input of filter stage 90 via a coupling resistor 95, as well as to the input of stage 91 via a coupling resistor 96, and to the noninverting input of amplifier 93 via a coupling resistor 97. In addition, the noninverting input of amplifier 93 is connected to the output of stage 90 by a coupling resistor 98 and to the output of stage 91 by a coupling resistor 99. The output of amplifier 93 is connected to common line 72 by a voltage divider composed of resistors 101 and 102, with the point of connection therebetween being connected to the amplifier inverting input.

The modulator receives at its input 11 a signal containing the 1,080 Hz FM carrier modulated with the data to be processed and a 720 Hz stock ticker carrier, the latter being removed from the signal appearing at point A, at the output of resonator 64.

Then, as shown in FIG. 2b, the signal is conducted through a differential amplifier 104 whose noninverting input is connected to the output of resonator 64 by a coupling resistor 105. The output of amplifier 104 is connected to the inputs of two further second order resonators 65 and 66 via respective coupling resistors 107 and 108.

The output of amplifier 104 is, moreover, connected to its inverting input by a feedback resistor 110, and the inverting input is also connected to the common line 72 by a series arrangement of a capacitor 112 and a resistor 113.

Resonators 65 and 66 are each tuned to a respective one of the peak frequency deviations of the signal of interest and act to demodulate that signal.

The outputs of resonators 65 and 66 are connected to a rectifier unit composed of two mutually oppositely poled diodes 115 and 116, diode 115 having its anode connected to the output of resonator 65 and diode 116 having its cathode connected to the output of resonator 66. The other side of each diode 115 and 116 is connected to the common line 72 via a respective capacitor 117 or 118 and to a respective coupling resistor 119 or 120.

Resistors 119 and 120 are connected together to the inverting input of a differential amplifier 123 having its noninverting input connected directly to the common line 72.

Between the output and the inverting input of amplifier 123 there is connected a feedback path constituted by a parallel arrangement of a resistor 125 and a capacitor 126. The output of amplifier 123 is connected to the common line 72 by a series arrangement of a resistor 127 and a capacitor 128, and the point of connection between components 127 and 128 is connected to the inverting input of amplifier 123 via a resistor 129.

The output of amplifier 123 is also connected to the noninverting input of a further differential amplifier 133 via a coupling resistor 135, a filter capacitor 136 being connected in shunt between the noninverting input of amplifier 133 and the common line 72. The inverting input of amplifier 133 is connected to its output by a feedback resistor 138 and to common line 72 by a resistor 139.

The output of amplifier 133 is connected to a series arrangement of a coupling resistor 141 and two inverters 143 and 144, with the output of inverter 144 being connected to demodulator output terminal 148.

Between diodes 115 and 116 and output 148, the demodulated signal is rectified, amplified and limited such that digital data is derived from that one of resonators 65 and 66 producing the largest magnitude output. The data at output terminal 148 is thus constituted by a binary stream of "ones" and "zeros".

All of the differential amplifiers shown in FIGS. 2a and 2b can be constituted by type 1458 operational amplifiers.

Figure 2C:
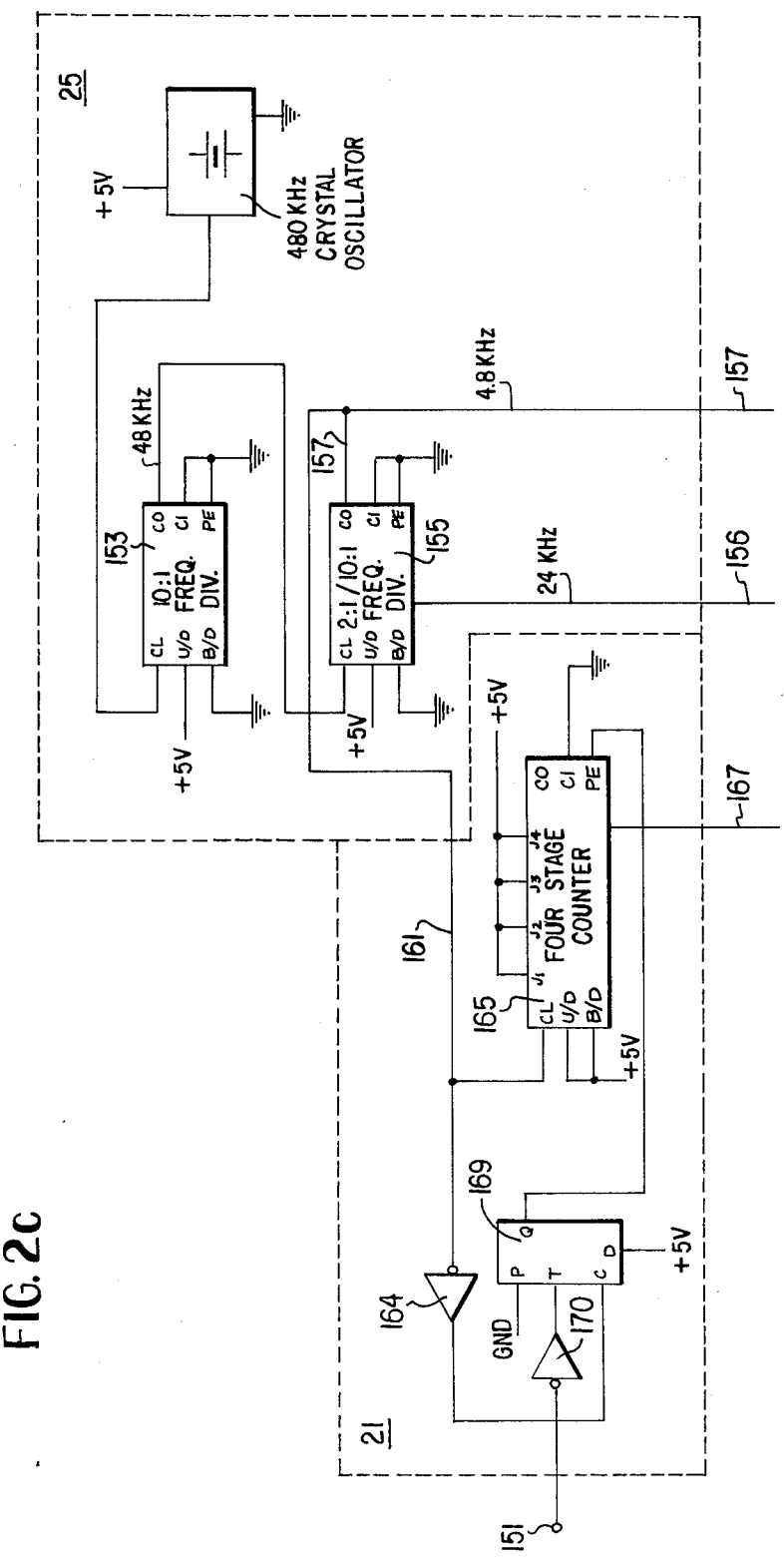

An embodiment of the bit phase synchronizer 21 and timing pulse source 25 of FIG. 1 is shown in detail in FIG. 2c.

The pulse source 25 includes a crystal oscillator of known design producing a stable output at a frequency of 480 KHz. This oscillator could be constructed in the manner disclosed in the March, 1976 issue of Ham Radio Magazine, at page 10, or as disclosed in the article by M. Lane entitled "Transistor Crystal Oscillator to Cover Frequency Range of 1 KHz to 100 MHz," published as Australian Post Office Research Labs Report No. 6513. The output signal from the oscillator is applied to the input of a 10:1 frequency divider 153 to produce an output pulse train having a repetition rate of 48 KHz. This pulse train is applied to the input of a further frequency divider 155 providing a 2:1 frequency division at a first output 156 and a 10:1 frequency division at a second output 157. Thus, output 156 provides a train of pulses having a repetition rate of 24 KHz and output 157 provides a train of pulses having a repetition rate of 4.8 KHz, which is exactly sixteen times the bit rate of the original binary signals and, therefore, of the binary signals delivered to input terminal 151 from demodulator 17.

The 4.8 KHz pulse train is conducted over a line 161 to synchronizer 21, where it is supplied to the input of an inverter 164 and to the clock input of a four-stage, or sixteen-state, binary counter 165. This counter is connected to count through its successive states in response to pulses applied to its clock input. Thus, as long as the only external signal to counter 165 is the 4.8 KHz pulse train applied to its clock input, the counter will count repetitively through its successive counting states, executing 300 complete counting cycles per second, i.e. 4800 clock pulses per second divided by 16 counting states per cycle, equal to the bit rate of the binary sequence supplied to input terminal 151.

Counter 165 produces, at its $Q_4$ output, a voltage having a value corresponding to a binary "1" during one-half of each counting cycle, i.e. between the counting states 1000 and 1111, and a voltage having a value corresponding to a binary "0" during the other half of each counting cycle, i.e. between the counting states 0000 and 0111. Thus, as counter 165 continues to count through its states under control of 4.8 KHz clock pulses, the signal at output $Q_4$ will constitute a pulse train having a repetition frequency of 300/sec. This signal is supplied to a conductor 167 and constitutes a synchronous clock pulse train for controlling the read-in of the binary signals appearing at terminal 151.

To assure accurate sensing and read-in of these binary signals, it is advantageous to sense the value of each bit at about the middle of the bit period. This is achieved by bit phase synchronizer 21. To this end, the synchronizer is provided with a dual D flip-flop 169 having its clear, or reset, input C connected to the input of inverter 164, its trigger, or toggle, input T connected to input terminal 151 via an inverter 170, its preset input P connected to ground, its data input D connected to receive a voltage corresponding to a binary "1", and its direct output Q connected to the presetenable input PE of counter 165.

Dual D flip-flop 169 is a versatile, commercially available unit which can be set to produce a binary "1" at its direct output Q, and a binary "0" at its complement output, by the presence of a voltage representing a binary "1" at its input P. In the present case, such a voltage would have a value of +5 V. Conversely, application of a voltage representing a binary "1", to its clear input C, sets direct output Q to produce a binary "0" and the complement output to produce a binary "1". In addition, when a voltage representing a binary "0", in this case ground potential, is applied to both inputs P and C, a positive pulse at trigger input T will cause the flip-flop to assume an output state determined by the value of the signal present at its data input D at the instant of application of the pulse to the trigger input, a voltage corresponding to a binary "1" producing a binary "1" at direct output Q and a voltage corresponding to a binary "0" producing a binary "0" at output Q. In the case of flip-flop 169, data input D is connected to constantly receive a voltage of +5 V, corresponding to a binary "1", so that each positive pulse at trigger input T sets direct output Q to its "1" state. The next binary "1" pulse applied to clear input C will reset the flip-flop to produce a binary "0" at direct output Q.

Output Q of flip-flop 169 is connected to the presetenable input of counter 165 and each time a "1" pulse is applied to that counter input, the counter is preset to the counting state represented by the signals at its setting inputs $J_1$, $J_2$, $J_3$ and $J_4$. In the present embodiment, all setting inputs receive a voltage corresponding to a binary "1" so that a pulse at input PE sets the counter to its 1111 state. Then, the subsequent pulses at clock input Cl cause the counter to count through successive states, a binary "1" value appearing on line 167 at the ninth clock pulse after counter 165 has assumed its 1111 state.

The binary data sequence from demodulator 17 is delivered to inverter 170 so that each negative transition in the binary sequence, i.e. each passage from a binary "1" value to a binary "0" value, will generate a positive pulse at toggle input T of flip-flop 169 and thus a "1" value will appear at input PE of counter 165. The next negative excursion of the 4.8 KHz clock pulse train on line 161 will produce, via inverter 164, a reset pulse at reset input C of flip-flop 169. Since a "1" value then appears at line 167 at the ninth clock pulse after application of a pulse to counter input PE, the occurrence of this "1" value will coincide with approximately the midpoint of the binary bit which began with the negative transition in the bit sequence.

The data format for which the disclosed circuit embodiment is intended involves a sequence of ten bits for each character, composed of, in succession, a start bit, seven data bits defining the character, a parity, or check, bit and a stop bit. The stop bit always has a value of "1", while the start bit always has a value of "0". Therefore, a negative transition will always occur at the start of each ten-bit character sequence, or word, and this will assure the desired time relation between the beginning of each data bit and the instant at which the bit value is sensed by the system. Even if no other negative transitions occur during receipt of a character sequence, the frequency of the clock pulses on line 161 will remain sufficiently stable to assure the desired synchronization. Any negative transition occuring during receipt of a ten-bit word will only serve to correct any small synchronization error that may have developed.

Figure 2D:
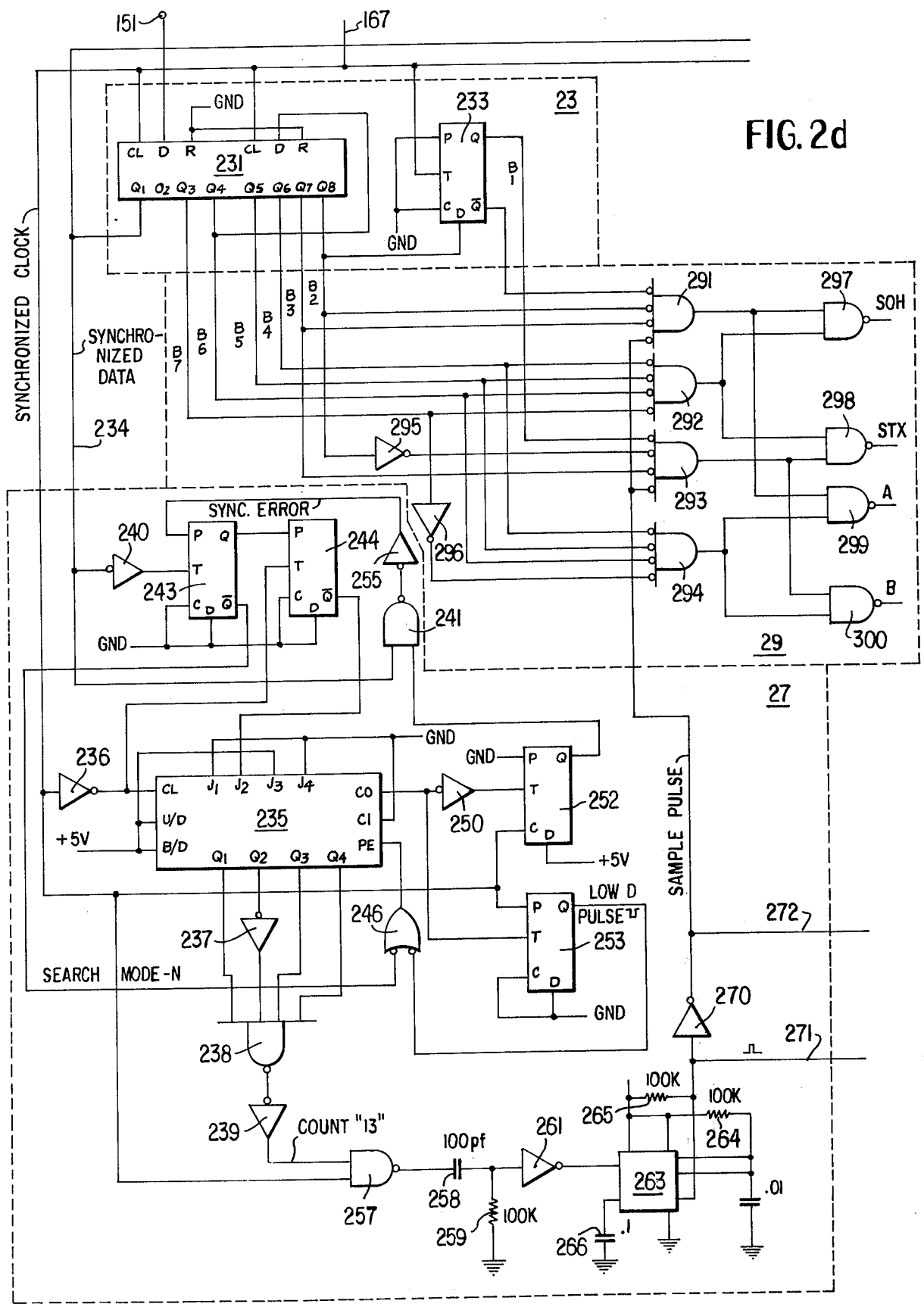

FIG. 2d illustrates one preferred embodiment of the serial-to-parallel converter 23, the character synchronizer 27 and the decoder 29 of the circuit of FIG. 1. The type of transmission system with which it is intended to utilize the present invention provides several distinct streams of information, or news services, transmitted in time division multiplex.

For example, one service provides general news while another service provides financial news. The time division multiplexing is carried out in a manner to effect transmission of 256 characters of general news alternating with 256 characters of financial news. Each group of 256 characters is associated with four identifying characters, including a start of heading (SOH) character indicating that a new line, or paragraph, is to start, a character identifying the group as relating to general news (A) or financial news (B), a start of transmission (STX) character, indicating that the 256 data characters follow immediately, and an end of transmission (EOT) character, signifying that transmission of the character group has been completed. Thus 256 data characters and four identifying characters make up one multiplex phase. Each character is composed of ten bits, arranged as described earlier herein. In data processing terms, each character can be referred to as a "word" and use of that term herein is intended to signify such a tenbit sequence.

To be able to suitably adapt the general news data, it is necessary to identify its corresponding multiplex phases. This is done by the units shown in FIG. 2d, including serial-to-parallel converter 23 composed of an 8-bit shift register 231 and a dual D flip-flop 233. Shift register 231 is here composed of a dual 4-bit shift register having the data input, D, of one 4-bit register connected to input terminal 151, the last output stage $Q_4$ of the one 4-bit register connected to the data input, D, of the second register, and the clock pulse inputs of both registers connected to line 167 to receive the synchronized clock pulses produced by synchronizer 21. The ouput $Q_6$ of the last stage of register 231 is connected to the data input D of flip-flop 233, here arranged as a trigger-controlled flip-flop having its trigger input T connected to synchronized clock line 167.

Thus, the read-in of signal bits to 8-bit register 231 is controlled by the synchronized clock pulses so that these bits will appear at the first stage output $Q_1$ of register 231 in synchronism with the synchronized clock pulses, and will therefore constitute a stream of synchronized data on output line 234 connected to output $Q_1$.

The ten bits of each character, or word, arriving at terminal 151 circulate through register 231, while the bit value at output $Q_8$ constitutes the data input to flip-flop 233. As a result, for each word arriving at terminal 151, there will occur a point in time at which the seven data bits thereof are present at output Q of flip-flop 233 and outputs $Q_8$, $Q_7$, $Q_6$, $Q_5$, $Q_4$ and $Q_3$ of register 231, respectively, as indicated by legends B1, B2, B3, B4, B5, B6 and B7 in FIG. 2d. At this same point in time, the parity bit and stop bit of the word will be present at outputs $Q_2$ and $Q_1$, respectively, of register 231, and any desired use can be made thereof.

At this point in time, the seven data bits are to be evaluated in decoder 29 to detect each general news (A) identifying character, whereupon the succeeding 256 data words are to be stored for transmission to printer controllers, and to detect each financial news (B) identifying character, whereupon, in the embodiment shown in detail in FIGS. 2, the succeeding 256 data words will simply be lost but in the general embodiment of FIG. 1, those words can be processed in circuitry 47.

The data bits of each word are tested and evaluated in decoder 29 and the proper instant for this is determined by character synchronizer 27.

Synchronizer 27 is composed of a four-stage, or four bit, counter 235 having its count inputs $J_1$ and $J_4$ connected to permanently receive a signal representing a binary "0" and its count input $J_3$ connected to permanently receive a signal representing a binary "1", and having its count outputs $Q_1$–$Q_4$ connected to a logic arrangement composed of inverters 237 and 239 and a NAND gate 238 to produce a pulse at the output of inverter 239 when counter 235 reaches a count of "1101" or decimal "13". Counter 235 is also provided with a carry input CI and a carry output CO. Application of a logic "1" potential to input CI blocks further counting by the counter. Output CO provides a carry pulse after the counter reaches its highest count state. The clock input of counter 235 is connected to synchronized clock line 167 via an inverter 236.

The synchronized data on line 234 is delivered to the input of an inverter 240 and one input of a NAND gate 241 forming part of synchronizer 27. The output of inverter 240 is connected to the toggle input T of a dual D flip-flop 243 whose direct output Q is connected to the preset input P of a second dual D flip-flop 244.

The inverting, or complement, output $\overline{Q}$ of flip-flop 244 is connected to the $J_2$ ($2^1$) input of counter 235, while the inverting output $\overline{Q}$ of flip-flop 243 is connected to one input of an OR gate 246 having its inputs connected so that its operates logically as a NAND gate. Each of flip-flops 243 and 244 has its reset input C and data input D connected to ground, which in the illustrated embodiment represents a binary "0".

The carry output CO of counter 235 is connected to the input of an inverter 250 whose output is connected to the toggle input T of a further dual D flip-flop 252. Carry output CO produces an output pulse having a duration of approximately one-half of a clock pulse period each time the counter reaches its maximum count state. Output CO of counter 235 is also connected to the toggle input T of another dual D flip-flop 253.

Flip-flop 252 is connected to have a binary "0" voltage applied to its preset input P and a binary "1" voltage applied to its data input D. The reset input C of flip-flop 252 and the preset input P of flip-flop 253 are both connected to line 167 to receive the train of synchronized clock pulses. The reset input C and data input D of flip-flop 253 are both connected to receive a binary "0" potential. The direct output Q of flip-flop 252 is connected to the other input of NAND gate 241, while the direct output Q of flip-flop 253 is connected to the other input of gate 246, and the output of gate 246 is connected to the preset-enable input PE of counter 235.

The output of gate 241 is connected to an inverter 255 whose output is connected to the preset input P of flip-flop 243.

The output of inverter 239 and synchronized clock line 167 are connected as inputs to a further NAND gate 257 whose output is connected, via a pulse forming, of differentiator, stage composed of a series capacitor 258 and a shunt resistor 259 to another inverter 261 whose output is connected to an inverting trigger input of a timer, or monostable multivibrator, 263, which can be constituted by a Type 555 timer, sold under that designation by several manufacturers.

Timer 263 is provided with biasing and operating resistors 264 and 265 and capacitors 266 and 267 and is arranged to produce a 1.1 msec output pulse each time the signal at the output of inverter 261 passes from a value of "1" to "0". The timer output pulse is applied to the input of an inverter 270 whose output is connected to decoder 29 via a line 272 to provide the sample pulses which each coincide with the end of a character period and which determine the instant at which the bits of each character will be examined. Each sample pulse has a voltage amplitude representing a binary "0".

The character synchronizer operates by responding to a "1" to "0" transition in the synchronized data stream. It thereupon counts ten clock pulses and produces a count output signal at the output of inverter 239. This signal acts together with the next-appearing clock pulse on line 167 to generate direct and inverter sample pulses on lines 272 and 271.

If another "1" to "0" transition appears in the synchronized data stream directly after production of such output signal, the counter signal counts ten clock pulses and produces a count output signal. If another such transition does not appear at that moment, a "1" signal appears on the sync error line connected between the output of inverter 255 and the preset input P of flip-flop 243 and counter 235 is halted until a further "1" to "0" transition appears in the data stream.

A "1" to "0" transition always occurs beteen the stop bit of one character and the start bit of the next character and if the counter begins counting in response to the occurrence of that transition, a further "1" to "0" transition will always occur after every ten clock pulses, and the desired synchronization will exist.

If the counter responds to a different "1" to "0" transition, a subsequent transition will fail to occur after one or several multiples of ten subsequent clock pulses, so that the synchronizer will resume "looking" for another "1" to "0" transition with which to synchronize. Based on the laws of probability, the synchronizer will, within a small number of character periods, synchronize onto successive transition from a stop bit to a start bit.

Decoder 29 is composed of a first group of conjunctive (AND) gates 291, 292, 293 and 294 connected to operate as NOR gates. One input of each of gates 291, 292 and 293 is connected to receive the sample pulses on line 272 and the remaining inputs of gates 291-294 are connected to lines B1-B7 coming from converter 23, with the aid of inverters 295 and 296, in a pattern determined according to standard decoding principles by the bit patterns to be detected.

Similarly, the outputs of gates 291-294 are connected in a selected pattern to four AND gates 297, 298, 299 and 300.

Figure 2E:
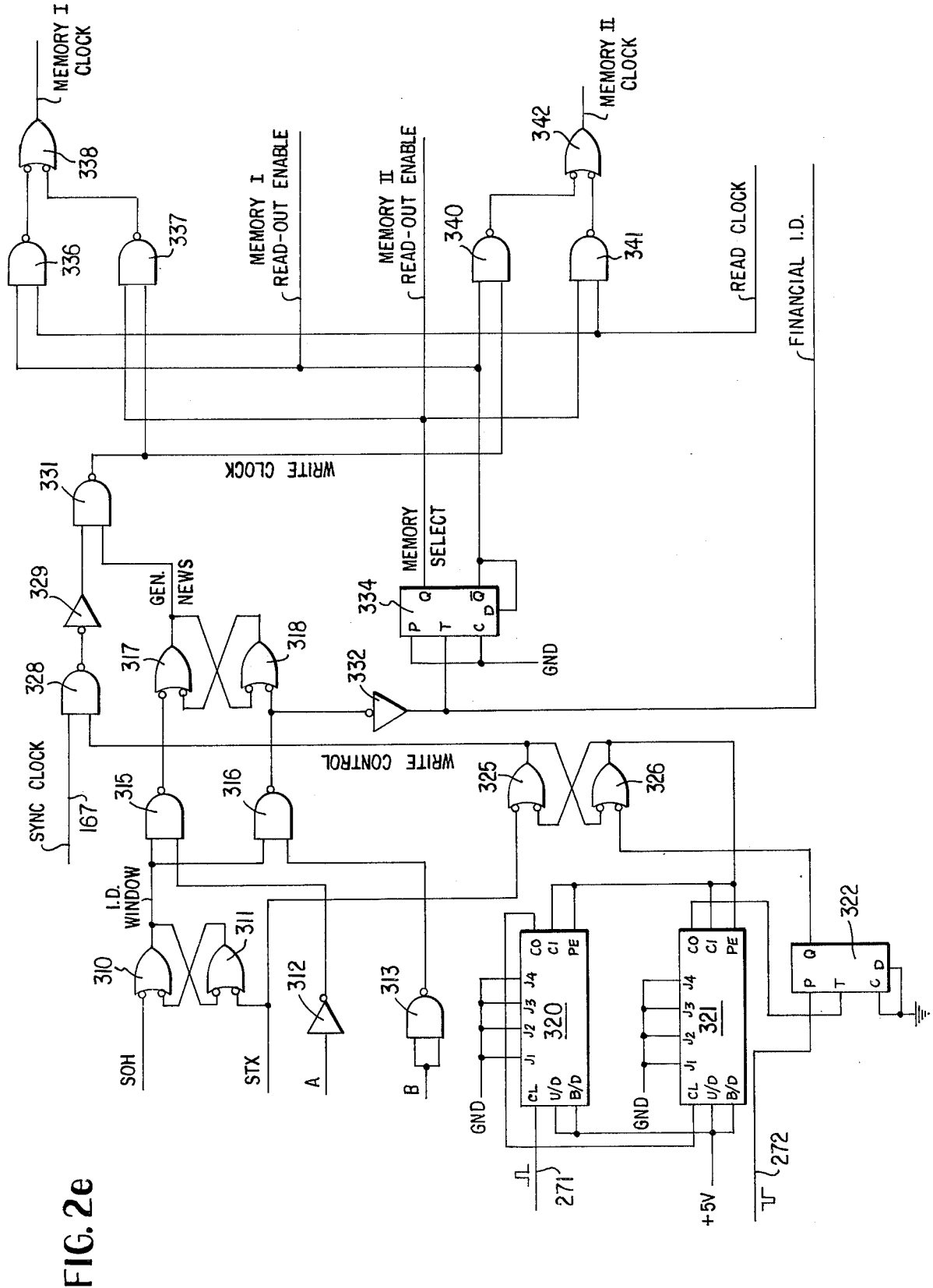

Referring now to FIG. 2e, there is shown an advantageous embodiment of the read-write control logic 31 which senses the arrival of a stream of general news data characters, feeds it to the memories, and controls subsequent read-out from the memories.

The logic includes a first latch unit composed of two OR gates 310 and 311 each connected to each operate according to the logic NAND function. One input of gate 310 is connected to decoder 29 to receive the SOH signals, while one input of gate 311 is connected to decoder 29 to receive the STX signals. When an SOH character is decoded, a pulse is supplied to place a binary "1" on the output of gate 310. This state remains until arrival of a pulse at the one input of gate 311, which will occur upon decoding of an STX character, whereupon the output of gate 310 presents a binary "0".

As will be seen, the "1" signal provides an "identification window" during which the character occurring between an SOH character and an STX character is monitored. This is either an "A" character identifying the next 256 characters as general news or a "B" character identifying the next 256 characters as financial news.

If an "A" character appears, a "1" signal is produced at the output of an inverter 312 whose input is connected to the "A" output line of decoder 29. If a "B" character appears, a "1" signal is produced at the output of an inverter 313 whose input is connected to the "B" output line of decoder 29.

The output of latch circuit 310, 311 is connected to one input of each of two NAND gates 315 and 316, the other input of gate 315 being connected to the output of gate 312 and the other input of gate 316 is connected to the output of inverter 313. The outputs of gates 315 and 316 are connected to inputs of a further pair of OR gates 317 and 318 each arranged to operate according to the logic NAND function and interconnected to constitute a further latch circuit.

When an "A" character appears during an "identification window", the resulting output signal from gate 315 causes a binary "1" to appear at the output of gate 317, while the appearance of a "B" character during a subsequent "identification window" causes a binary "0" to appear at the output of gate 317. Thus, a "1" signal at the output of gate 317 indicates the presence of general news and remains, after appearance of an "A" character, for the duration of the succeeding 256 data characters The logic further includes a pair of four-bit counters 320 and 321, counter 320 having its clock pulse input connected to line 271 to receive positive polarity sample pulses from synchronizer 27 and having its count output CO connected to the clock pulse input of counter 321, the count output CO of counter 321 being connected to the toggle input T of a dual D flip-flop 322 whose preset input P is connected to line 272 to receive the negative polarity sample pulses from synchronizer 27.

Counters 320 and 321 have their count inputs set to "0" and function together as a 256-pulse counter producing a pulse at output CO of counter 321 after each succession of 256 sample pulses at the clock pulse input of counter 320.

Flip-flop 322 has its data input connected to a binary "0" potential so that each pulse applied to its toggle input produces a binary "0" signal at its direct output Q. The signal at this output Q is then reset to "1" by the trailing edge of the then-occurring sampling pulse on line 272.

The STX line from decoder 29 is connected to one input of an OR gate 325 forming a further latch circuit with an OR gate 326, each of these gates being connected to operate according to the logic NAND function. One input of gate 326 is connected to the Q output of flip-flop 322. Thus, a binary "1" signal appears at the output of gate 325 each time a recognition signal appears on the STX line, and the output of gate 325 returns to the binary "0" state upon occurrence of the next "0" pulse at output Q of flip-flop 322.

The "1" signal at the output of gate 325 constitutes a write control signal that remains for 256 character periods after occurrence of each STX character. This signal is applied as an enabling signal to one input of a NAND gate 328 in order to gate the sync clock pulses on line 167, connected to the other input of gate 328.

The output of gate 328 is connected to an inverter 329 whose output is in turn connected to one input of a NAND gate 331. The other input of gate 331 is connected to the output of gate 317 so that the sync clock pulses appear at the output of gate 331 whenever a write control signal and a general news identifying signal are both present.

An inverter 332 is connected to the output of gate 316 to produce an output pulse each time a "B" character signal is applied to gate 316 during an identification window. The output of gate 332 thus provides a financial news identification pulse which could be employed for control purposes in a parallel financial news processing system.

The output of inverter 332 is connected to the toggle input T of a dual D flip-flop 334 whose data input D is connected to its complement output $\overline{Q}$ so that each pulse at input T inverts the output state of the flip-flop.

The output stage of logic 31 is composed of two NAND gates 336 and 337 and an OR gate 338 connected to operate according to the logic NAND function, associated with memory I, and a similar arrangement of two NAND gates 340 and 341 and an OR gate 342 connected to perform the logic NAND function, associated with memory II.

Each of gates 337 and 340 is connected to receive the write clock pulses from the output of gate 331, while each of gates 336 and 341 has one input connected to a line providing memory read clock pulses. The direct output Q of flip-flop 334 is connected to the other input of gates 337 and 341, while the complement output $\overline{Q}$ of the flip-flop is connected to the other input of gates 336 and 340. The outputs of gates 336 and 337 are connected to gate 338, whose output provides the clock pulses for memory I, while the clock pulses for memory II appear at the output of gate 342 whose inputs are connected to the outputs of gates 340 and 341.

Thus, when the output state of flip-flop 334 is such that $Q = 1$ and $\overline{Q} = 0$, write clock pulses are gated through to memory I and read pulses are gated through to memory II. Conversely, when $Q = 0$ and $\overline{Q} = 1$ at the outputs of flip-flop 334, read clock pulses are gated through to memory I and write clock pulses are gated through to memory II. Write clock pulses occur only during arrival of the 256 data word of a block of general news and are suppressed during arrival of identification bits, i.e. ETX, SOH, A, B, STX, and during arrival of a block financial news data words.

Figure 2F:
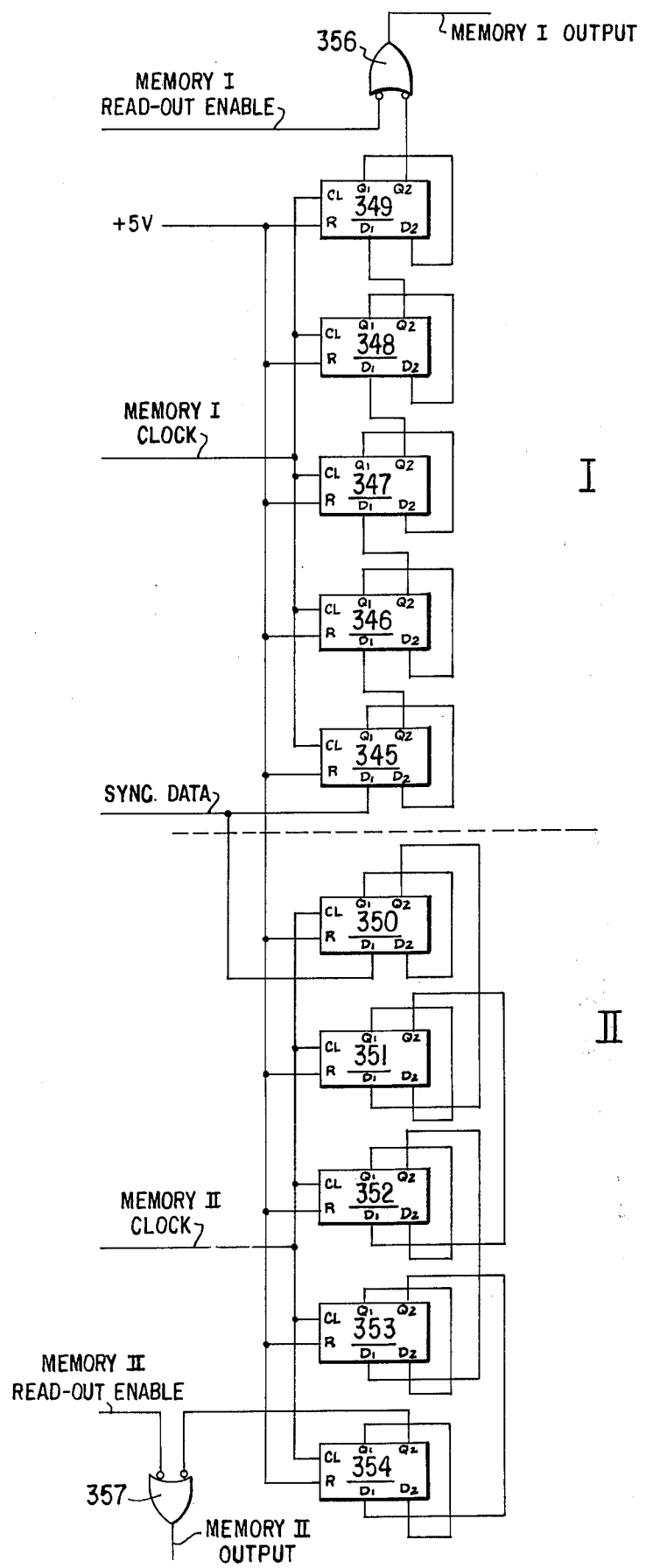

An embodiment of memories I and II is shown in FIG. 2f. Each memory is composed of five shift registers, memory I including registers 345, 346, 347, 348 and 349, and memory II including registers 350, 351, 352, 353 and 354. Each register has a capacity of 512 bits and they are here illustrated as dual 256-bit registers, one 256-bit register having input $D_1$ and output $Q_1$ and the other having input $D_2$ and output $Q_2$.

To provide for serial storage of 256 ten-bit characters, the $Q_1$ output of each dual register is connected to its associated $D_2$ input, while the $Q_2$ output is connected to the $D_1$ input of the next succeeding dual register, thereby connecting 2560 bit storage locations in series. The $D_1$ inputs of memories 345 and 350 are connected to receive the synchronized data from converter 23 so that whenever clock pulses are fed to the registers of either memory, the arriving data will be stored therein.

The $Q_2$ output of register 349 is connected to one negated input of an OR gate 356 connected to operate according to the logic NAND function. The other negated input of gate 356 is connected to receive the memory I read-out enable signal produced at the $\overline{Q}$ output of flip-flop 334 in the control logic 31. Similarly, the $Q_2$ output of register 354 is connected to one negated input of an OR gate 357 connected to operate according to the logic NAND function and having its other negated input connected to receive the memory II read-out enable signal from the Q output of flip-flop 334.

In the operation of the illustrated system, a train of write-in clock pulses is delivered to only one memory at a time, in alternation from one general news period to the next. Each train of write-in pulses coincides precisely with the arrival of 256 data characters.

After a stream of general news data character bits has been written into a memory, its associated output gate 356 or 357 is opened and the next clock pulses applied to that memory are read-out clock pulses.

While read out begins almost immediately after the end of a general news character stream, read out can not be completed during the ensuring financial news phase because of the need to introduce printer control signals into the stream of data being read out. It is for this reason that two memories are provided and are connected to receive alternate streams of general news character signals. Thus read-out of a given stream of general news character signals from one memory can continue even after commencement of write-in of the next succeeding stream of general news character signals to the other memory.

It will be noted that the capacity of each memory corresponds exactly to the number of general news character bits occurring during a general news period. Therefore, any signals which may be stored in a memory at the start of a write-in phase will be pushed out, during the write-in period, and replaced by the incoming general news character bits.

Figure 2G:
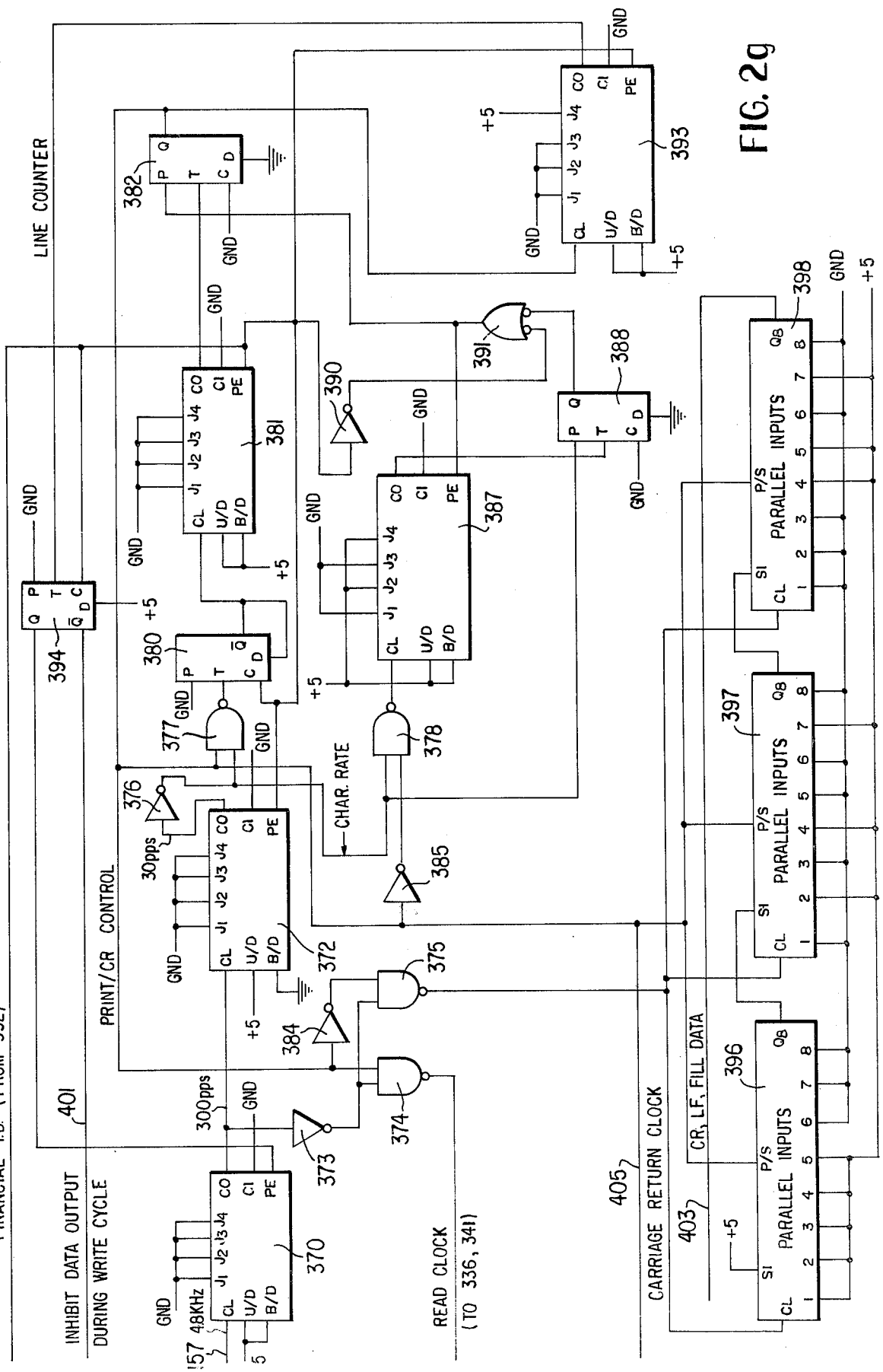

A preferred embodiment of the memory read-out control unit 33 is shown in FIG. 2g. This unit generates read clock signals for controlling the read-out from memories I and II and the necessary printer control signals, and assures insertion of the printer control signals at the proper places in the general news character bit stream.

Unit 33 includes a first four-bit binary counter 370 having its count inputs preset to a count of "0" and having its clock pulse input connected to line 157 to receive the 4.8 KHz pulse sequence from pulse source 25. Thus, at the carry output CO of counter 370 there will appear a train of pulses at a rate of 300 pps, which is the rate at which it is desired to read data bits out of the memories.

Output CO of counter 370 is connected to the clock pulse input of a further counter 372 which is connected to operate at a decimal counter, i.e. to count through ten states and then return to a starting state. The count inputs of counter 372 are also preset to a value of "0" so that a pulse appears at the carry output CO of counter 370 after every ten pulses appearing at its clock input. Therefore, the output CO of counter 372 will provide a train of pulses at a rate of 30 pps, representing the character read-out rate. The output CO of counter 370 is connected via an inverter 373 to one input of each of two NAND gates 374 and 375, while the output CO of counter 372 is connected via an inverter 376 to one input of each of two NAND gates 377 and 378.

The output of gate 377 is connected to the trigger input T of a dual D flip-flop 380 whose preset input P is permanently connected to ground, i.e., is set to binary "0", and whose complement output $\bar{Q}$ is connected to its data input D. With this connection, as long as the signal on the line connected to input C has a value corresponding to a binary "0", each pulse applied to the trigger input T of the flipflop will invert the output state thereof.

The complement output $\bar{Q}$ of flip-flop 380 is connected to the clock pulse input of a further four-bit binary counter 381 whose inputs are preset to a value of "0" and whose carry output CO is connected to the trigger input T of a further dual D flip-flop 382. The clear input C of flip-flop 382 is permanently connected to ground, i.e. is set to a binary "0" value. The data input D of flip-flop 382 is also connected to ground to receive a signal corresponding to a binary "0". When a binary "1" appears at preset input P of flip-flop 382, a binary "1" signal value appears at its direct output Q, and when a binary "1" signal is not present at input P, a trigger pulse at trigger input T will cause a binary "0" to appear at the direct output Q.

The direct output Q of flip-flop 382 is connected to the other input of each of NAND gates 374 and 377 as well as to an output line 405 and, via respective inverters 384 and 385, to the respective inputs of NAND gates 375 and 387. Thus, when a binary "1" is present at the output Q of flip-flop 382, gates 374 and 377 are enabled, while a binary "0" at output Q of flip-flop 382 serves to enable gates 375 and 378.

The output of gate 378 is connected to the clock pulse input of another four-bit binary counter 387 whose count inputs are preset to a value corresponding to decimal "10", whereby an output pulse will appear at the carry output CO of counter 387 after the arrival of six pulses at its clock input. The output CO of counter 387 is connected to the trigger input T of a dual D flip-flop 388 whose clear input C and data input D are both connected to be at a potential corresponding to a binary "0" and whose preset input P is connected to the output of inverter 376. Thus, a binary "1" value will be present on the direct output Q of flip-flop 388 whenever a binary "1" signal is present at its preset input P, while a binary "0" value will appear at direct output Q whenever the signal at its preset input P has a value corresponding to a binary "0" and a trigger pulse appears at its trigger input T.

The preset-enable inputs PE of counters 372 and 381 and the clear input C of flip-flop 380 are connected to receive the financial ID pulses produced at the output of inverter 332 of control logic 31. The output of inverter 332 is also connected, via an inverter 390, to one input of a gate 391 which is connected to perform a logic NAND function. The other input of gate 391 is connected to the direct output Q of flip-flop 388, while the output of gate 391 is connected to the preset-enable input PE of counter 387 and to the preset input P of flip-flop 382.

In the operation of the circuit thus far described, the appearance of a financial ID pulse at the output of inverter 332 of control logic 31 will preset counters 372 and 381 to their predetermined initial count states, and will set flip-flop 380 to the state in which a binary "1" appears at its complement output $\bar{Q}$. The direct output of flip-flop 388 normally providing an output signal representing a binary "1", a financial ID pulse will also cause a binary "1" pulse to appear at the output of gate 391 and this value will be applied to the preset input P of flip-flop 382, as well as to the preset-enable input PE of counter 387. As a result, a binary "1" value will appear at the direct output of flip-flop 382 and counter 387 will be preset to its initial count state, determined by the signals being applied to its count inputs $J_1 \ldots J_4$.

The binary "1" signal at the output Q of flip-flop 382 will enable gates 374 and 377, while disabling gates 375 and 378. As a result, the 300 pps pulses appearing at the carry output CO of counter 370 will be gated through gate 374 and will be delivered to inputs of gates 336 and 341 of control logic 31. The pulses at output CO of counter 370 are applied to the clock pulse input of counter 372, every ten pulses producing a pulse at the carry output CO of counter 372.

These pulses at output CO of counter 372 are applied via inverter 376 to the one input of gate 377 and since that gate is currently enabled, the carry output pulses from counter 372 will be gated through and delivered to the trigger input T of flip-flop 380. Every other pulse at that trigger input T will set the complement output $\bar{Q}$ of flip-flop 380 to a binary "1" value and each such setting of the complement output Q of flip-flop 380 serves as a clock pulse for counter 381. A binary "0" output pulse will appear at the carry output CO of counter 381 after every sixteen pulses applied to its clock input. Since one pulse appears at its clock input after every two pulses at the carry output CO of counter 372, a pulse at the carry output CO of counter 381 will correspond to the occurrence of 32 pulses at the output CO of counter 372. Thus, the time between the appearance of a binary "1" value at the output Q of flip-flop 382 and the appearance of a pulse at the output CO of counter 381 corresponds to the time required for 320 clock pulses to appear at the output CO of counter 370, or 32 character periods. The signal at the Q output of flip-flop 382 is supplied to output line 405 to control emmission of memory read-out signals from the data adapter. Whenever a binary "1" appears at output Q of flip-flop 382, such emission can occur.

When a pulse appears at output CO of counter 381, flip-flop 382 is reset so that a binary "0" value appears at its direct output Q. This disables gates 374 and 377, while enabling gates 375 and 378. Thereupon subsequent pulses at the output CO of counter 372 are gated through gate 378 to the clock pulse input of counter 387 and after 6 pulses have been applied to the clock pulse input of this counter, corresponding to 6 character periods, a pulse appears at its carry output CO, in time coincidence with the presence of a binary "0" value at the output of inverter 376. Thereupon, flip-flop 388 is reset so that a binary "0" value appears at its direct output Q, whereupon a binary "1" is again applied to the preset input T of flip-flop 382, causing a binary "1" to appear at its direct output Q and reinitiating the performance of a count cycle by elements 372, 380 and 381. As will be seen, the period during which clock pulses are being applied to, and counted by, counter 387 constitutes the period during which printer control signals are being inserted into the stream of data being read out from the memories I and II.

Each "0" to "1" transition at the direct output Q of flip-flop 382 is supplied as a clock pulse to the clock pulse input of a further four-bit binary counter 393 whose count inputs are preset to a value corresponding to a decimal "8" and whose preset-enable input PE is also connected to receive the financial ID pulses from inverter 332 of control logic 31. After every 8 pulses applied to the clock pulse input of counter 393, an output pulse appears at its carry output CO. This pulse indicates that eight groups of 32 data characters have been read out from memory currently undergoing readout, or in other words characters which are to be printed in 8 lines by the printer have been read out.

The output CO of counter 393 is connected to the trigger input T of another dual D flip-flop 394 whose preset input P is connected to ground, representing a binary "0", data input D is connected to a source of +5 V, representing a binary "1", and clear output C is connected to the output of inverter 332 of control logic 31 so that each financial ID pulse will set the direct output Q of the flip-flop to a to a binary "0" state and the complement output $\overline{Q}$ thereof to the binary "1" state. When the flip-flop 394 is in this output state, counter 370 continues to count the pulses applied to its clock pulse input, and the circuit operates in the manner described above.

Upon the appearance of a pulse at the carry output CO of counter 393, the output state of flip-flop 394 is inverted, so that a binary "1" value appears at its direct output Q, resulting in presetting of counter 370 to its initial count state. At the same time, there appears at the complement output $\overline{Q}$ of flip-flop 394, a binary "0" value which is supplied via line 401 to combiner 35 to block the output of data signals during the intervals between the completion of read-out from one memory and the appearance of the next succeeding financial ID pulse, indicating that write-in to the other memory has been completed.

During the intervals when gates 375 and 378 are enabled, the pulses produced at the output CO of counter 370 are gated via gate 375 to the clock pulse inputs of three serial/parallel shift registers 396, 397 and 398. Each of these registers is composed of 8 stages, each stage having its own parallel input via which it can be set to a respective binary state when the register is being operated in its parallel mode. In addition, each register has a shift input SI via which its first stage can be set to a selected binary state when the register is operating in its serial mode.

The operating mode of each register is determined by the value of the signal applied to its parallel/serial control input P/S, each register operating in its parallel mode when a binary "1" signal is being applied to its P/S input and in the serial mode when a binary "0" is being applied to its P/S input. The output $Q_8$ of the last stage of each of registers 396 and 397 is connected to the shift input SI of the next succeeding shift register, while the shift input SI of register 396 is permanently connected to receive a potential representing a binary "1" and the last stage output $Q_8$ of register 398 is connected via an output line 403 to combiner 35.

The parallel inputs of the shift registers 396, 397 and 398 are connected to sources of binary "1" and "0" potentials in the pattern required to provide the necessary line feed, carriage return and fill data signals required to instruct the particular printer with which the system operates to execute a carriage return and line feed operation.

Each time a binary "1" value appears at the direct output Q of flip-flop 382, there is applied to the inputs P/S of registers 396, 397 and 398 a signal which sets them to operate in the parallel mode, whereupon their stages are set in accordance with the signal values appearing at their parallel inputs. Then, each time the signal on the direct output Q of flip-flop 382 goes to binary "0", registers 396, 397 and 398 are switched to operate in their serial mode and the clock pulses produced by counter 370 are supplied to the clock pulse inputs of the shift registers to cause the signal sequences previously stored in their stages to be shifted serially through the stages of the three registers and to line 403.

At the end of the printer control signal readout following readout of the eighth line of characters to be printed, the pulse produced at the output CO of counter 393 sets flip-flop 394 into a state in which counter 370 is preset, and maintained in its preset condition, so that the production of further pulses at the output CO of counter 370 is prevented, whereupon the generation of both read clock and carriage return clock pulses is terminated until arrival of the next financial ID pulse from the output of inverter 332.

The duration of the printer control signal readout phase, determined by the effective counting period of counter 387, is selected on the basis of the number of bits required to instruct the printer to execute carriage return and line feed operations and the time required by the printer mechanism to actually perform these operations. The length of the period can be adjusted simply by appropriate selection of the signal values applied to the count inputs $J_1 \ldots J_4$ of counter 387.

Figure 2H:
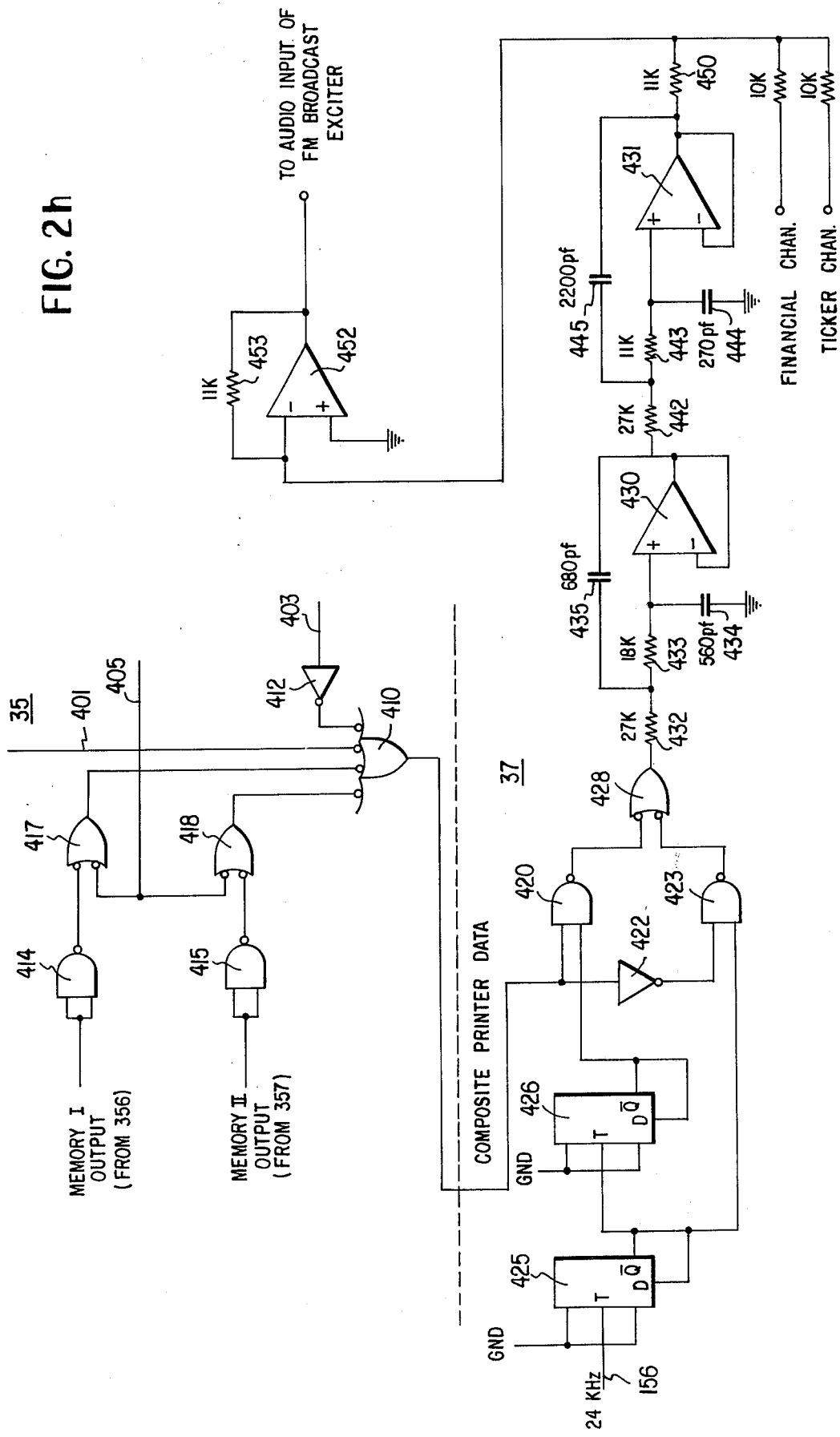

FIG. 2h illustrates a preferred embodiment of the combiner 35 and FM modulator 37 of the complete data adapter circuit shown in FIG. 1.

Combiner 35 includes an OR gate 410 provided with four negated inputs so that pulses applied to any one of the inputs will be gated through only if a binary "1" signal is present at each of the other inputs. One input of gate 410 is connected to the output of an inverter 412 whose input is connected, in turn, to the output line 403 from read-out control unit 33, this output providing the printer control signal. A second input of gate 410 is connected to output line 401 of control unit 33. As has been mentioned above, the signal on line 401 prevents the gating through of signal pulses applied to any other input of gate 410 whenever the complement output $\overline{Q}$ of flip-flop 394 is in the binary "0" state.

The combiner further includes two AND gates 414 and 415, both connected to operate as inverters. Both inputs of gate 414 are connected to the output of gate 356 of memory I to receive the signals appearing at the output of memory I during each phase of read-out therefrom. Similarly, gate 415 has both of its inputs connected to the output of gate 357 of memory II to receive the output signals from that memory during each phase of read-out therefrom. The output of gate 414 is connected to one negated input of an OR gate 417, while the output of gate 415 is connected to one negated input of a second OR gate 418. Each of gates 417 and 418 has two negated inputs and thus operates according to the logic NAND function. The other negated input of each of gates 417 and 418 is connected to output line 405 from control unit 33 to enable both of these gates only when a read-out emission control signal, having a value corresponding to a binary "1", is present on line 405. The outputs of gates 417 and 418 are connected to respective further input of gate 410.

The output of gate 410 thus provides composite printer data composed of sequences of character data signals and printer control signals and this composite data is supplied to FM modulator 37, the data being applied directly to one input of a NAND gate 420 and, via an inverter 422, to one input of a further NAND gate 423. Signals for the other inputs of gates 420 and 423 are provided by an arrangment composed of two dual D flip-flops 425 and 426 both having their preset and clear inputs connected to ground and their data inputs D connected to their respective complement outputs $\overline{Q}$. In this configuration, each of flip-flops 425 and 426 will operate effectively as a 2:1 frequency divider in that each pulse applied to the trigger input T of each flip-flop will act to invert the output state of its complement output $\overline{Q}$. The trigger input T of flip-flop 425 is connected to line 156 from pulse source 25 to receive a train of 24 KHz square wave pulses. Thus, a 12 KHz square wave pulse train will appear at the complement output $\overline{Q}$ of flip-flop 425 and this signal is applied to the other input of gate 423 and to the trigger input T of flip-flop 426. A 6 KHz square wave therefore appears at the complement output $\overline{Q}$ of flip-flop 426 and this signal is delivered to the other input of gate 420. With this arangement, whenever a binary "1" is present at the output of gate 410 of combiner 35, NAND gate 420 is enabled to pass a succession of 6 KHz pulses, while the appearance of a binary "0" value at the output of gate 410 enables gate 423 to pass a succession of 12 KHz pulses. Thus, during readout of either memory, each binary "1" signal appearing at the $Q_2$ output of the last memory stage (349 or 354) will result in the appearance of a 6 KNz pulse sequence at the output of gate 420, while each binary "0" appearing at the output $Q_2$ of the last memory stage will result in the appearance of a train of 12 KHz pulses at the output of gate 423.

The outputs of gates 420 and 423 are connected to respective inputs of an OR gate 428 having negated inputs so that this gate also operates according to the logic NAND function.

The output of gate 428 is connected to a filter circuit which removes the higher frequency harmonics from the square waves at the output of that gate in order to produce an output signal which is substantially a sine wave. The filter is composed of two differential amplifiers 430 and 431, with the direct input of amplifier 430 being connected to the output of gate 428 by a series arrangment of two resistors 432 and 433. The direct input of amplifier 430 is additionally connected to ground via a capacitor 434. In addition, amplifier 430 is provided with a feedback path defined by a capacitor 435 connected in feedback between the amplifier output and the point of connection between resistors 432 and 433. Similarly, the direct input of amplifier 431 is connected to the output of amplifier 430 by a series arrangement of two resistors 442 and 443, the direct input of amplifier 431 additionally being connected to ground via a capacitor 444. Amplifier 431 is provided with a feedback connection constituted by a capacitor 445 connected between the amplifier output and the point of connection between resistors 442 and 443. Each amplifier additionally has its output connected directly to its inverting input. Each of amplifiers 430 and 431 can be constituted by a standard, commercially available operational amplifier, while each of the resistors and capacitors can have the value indicated on the drawing.

The output of amplifier 431 is connected via a coupling capacitor 450, having the value shown, to the inverting input of a differential amplifier 452, which can also be constituted by a commercially available operational amplifier. This amplifier is provided with a feedback path defined by a resistor 453 connected between its output and its inverting input. The direct input of amplifier 452 is connected directly to ground.

Amplifier 452 constitutes a summing amplifier which can additionally accept financial signals and ticker tape signals which can have been reformatted in circuitry comparable to that disclosed herein for delivery to printers. For each of these additional information sources, the disclosed system could be supplemented by a further dual memory and suitable read electronics. The output of amplifier 452 is conducted to the audio input of the FM broadcast exciter provided in the existing system and employed for transmitting signals in the television display format.

In the illustrated embodiment, the general news signals have been placed in the form of a sine wave whose frequency is 6 KHz or 12 KHz, depending on the binary value of the signal being read out from one of the memories, or from the printer control signal generating unit. When it is additionally desired to provide financial news and ticker news in a format suitable for acceptance by a printer unit, the frequencies employed for the financial news could be 2 KHz and 4 KHz, which would not interfere with the general news frequencies. Stock ticker information can be provided, through the use of a further modulator, in the form of 600 and 1200 Hz signals.

In a system according to the present invention, each subscriber location, which is equipped with a suitable data printer and its associated interface, is provided with a printer controller connected between the cable TV signal input line and the printer information input to extract the printer signals produced by the data adapter at the CATV transmitter and to convert those signals back into a binary pulse train capable of operating the printer.

Figure 3:
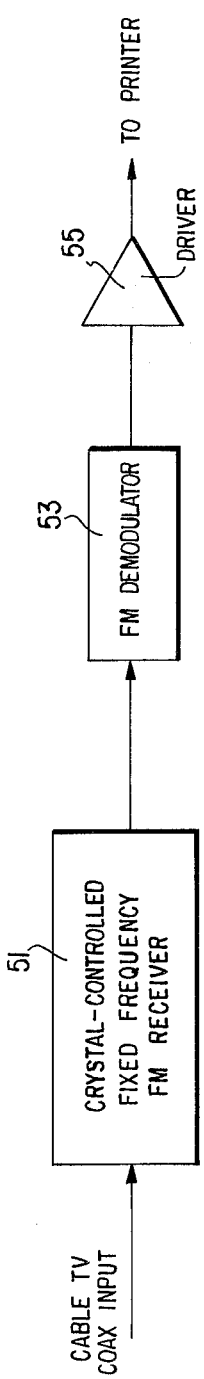
FIG. 3 is a block circuit diagram of a printer controller member of a system according to the invention.

In the specific arrangement disclosed herein, the printer information generated in the data adapter is applied to frequency modulate an 88.7 MHz carrier. As shown in FIG. 3, the printer controller is basically composed of a crystal-controlled, fixed frequency FM receiver 51 connected to receive the signal supplied to the cable TV coaxial input line and to derive therefrom the train of 6 KHz and 12 KHz waves. In the illustrated circuit, a succession of 6 KHz waves during a bit period corresponds to a binary "1", while a series of 12 KHz waves during a bit period corresponds to a binary "0".

The output from receiver 51 is applied to the input of an FM demodulator 53 which converts the output signal from receiver 51 to a train of binary bits having, for example, a value of +10 V for a bit value of "1" and 0 V for a bit value "0". From FM demodulator 53, the binary signals are conducted to a driver 55 which places the binary signals at voltage levels suitable for acceptance by an interface unit associated with the printer. For example, output voltage levels of −10 V representing a binary "1" and +10 V representing a binary "0" satisfy the output requirements of common, commercially avilable communications printer interfaces, such as those of the type designated EIA STD RS232C.

Figure 4A:
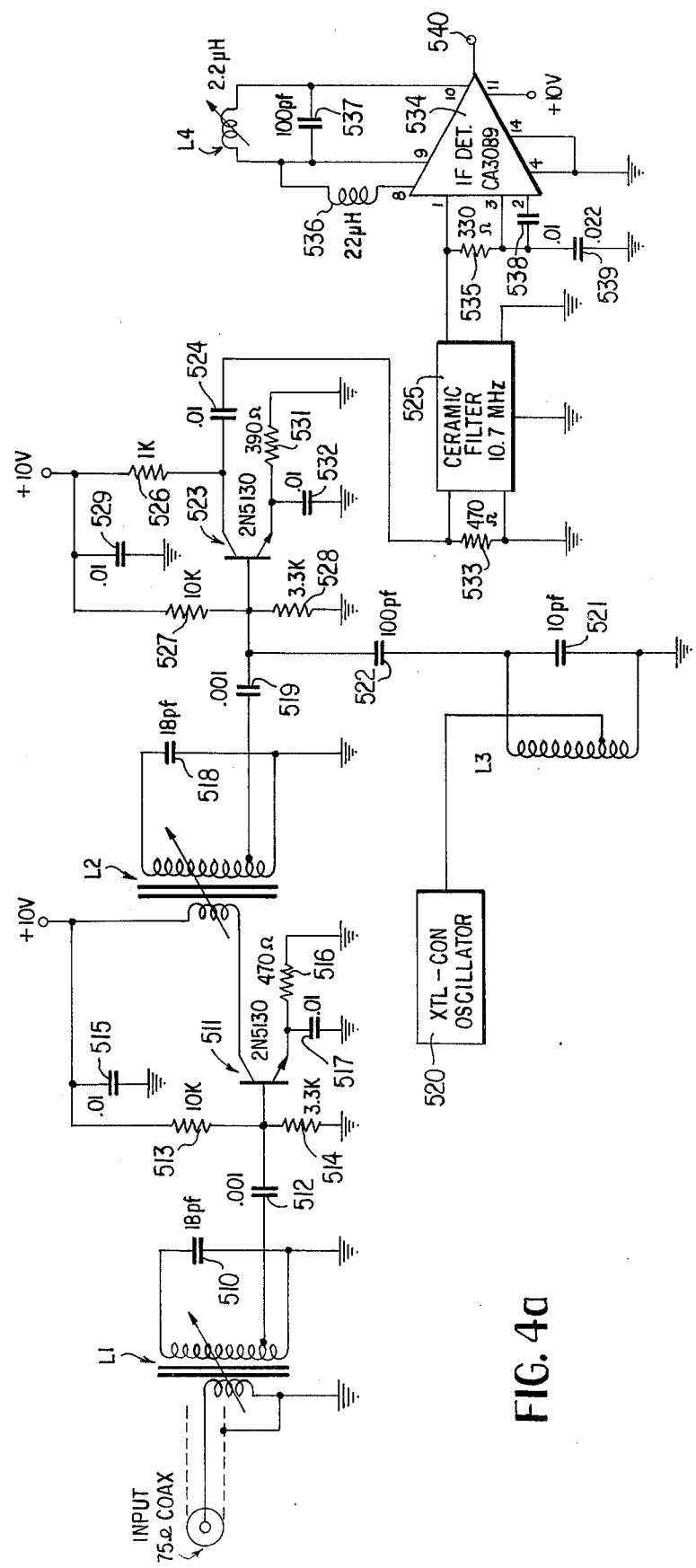
FIGS. 4a and 4b are circuit diagrams of preferred embodiments of circuits of the unit of FIG. 3.

One preferred embodiment of the receiver 51 is shown in FIG. 4a, on which suitable passive component values and active component types are indicated. The receiver input is defined by a first slug-tuned transformer L1 having its primary connected to a 75 Ω coaxial cable constituting the subscriber station input line. The primary and secondary of transformer L1 each have one end connected to ground, while a capacitor 510 is connected across the transformer secondary. An output signal is taken from a tap on the transformer secondary.

Transformer L1 constitutes the input of a broad-tuned RF amplifier stage whose primary purpose is to isolate the receiver from the CATV network.

The RF amplifier stage further includes a transistor 511 having its base connected to the transformer secondary tap via a capacitor 512. Transistor 511 serves as an amplifying element whose output is taken from its collector electrode, connected to one side of the primary of a second transformer L2. The other side of the primary is connected to a source of a d.c. operating voltage, as is one side of a resistor 513 which together with a second resistor 514 forms a voltage divider connected between the d.c. power supply for the circuit and ground to provide the required d.c. bias for transistor 511. A capacitor 515 is connected in parallel with the voltage divider 513, 514. The emitter of transistor 511 is connected to ground via a parallel arrangement of a resistor 516 and a capacitor 517.

Transformer L2 is also a slug-tuned transformer across whose secondary is connected a capacitor 518, the output of the RF amplifier being taken from a tap on the secondary of transformer L2. One side of the secondary of transformer L2 and one side of capacitor 518 are connected to ground.

The broad-tuned amplifier stage is followed by a tuned mixer stage in which the amplifier stage output is combined with a 99.4 MHz signal from a crystal-controlled, fixed frequency oscillator 520 whose output is coupled to the tap of an autotransformer L3 across the terminals of which is connected a capacitor 521. One end of the coil of transformer L3 and one end of capacitor 521 are connected to ground, while the other end thereof is connected via a coupling capacitor 522 to a summing point to which the output of the broad tuned amplifier stage is also connected, via a respective coupling capacitor 519.

Mixing of the 99.4 MHz sine wave from oscillator 520 with the 88.7 MHz component in the signal delivered by the amplifier stage produces a 10.7 MHz IF signal commponent.

The mixer stage includes an amplifying transistor 523 whose base is connected to the summing point and whose collector provides an output signal supplied to the input of a 10.7 MHz ceramic filter 525 via a coupling capacitor 524.

Bias levels for transistor 523 are provided by a resistor 526 connected between the d.c. power supply and the transistor collector and a voltge divider 527, 528 connected between the power supply and ground and having its tap connected to the transistor base. A capacitor 529 is connected in parallel with divider 527, 528. The emitter of transistor 523 is connected to ground via a parallel arrangement of a resistor 531 and a capacitor 532.

A matching resistor 533 is connected across the input of filter 525 and the filter separates the 10.7 MHz IF signal component from signal components at nearby frequencies. The output of filter 525 is connected to the input of an IF detector circuit 534 which both limits and demodulates the output signal from the filter. The detector could be type CA3089E manufactured by RCA and the numbers adjacent the various terminals of the detector are the pin number designations provided by the manufacturer.

In the illustrated circuit, the detector unit is completed by an input resistor 535, inductor 536, variable choke coil L4, and capacitors 537, 538 and 539. The signal appearing at detector output terminal 540 contains the 6 KHz and 12 KHz representations of the binary data.

Figure 4B:
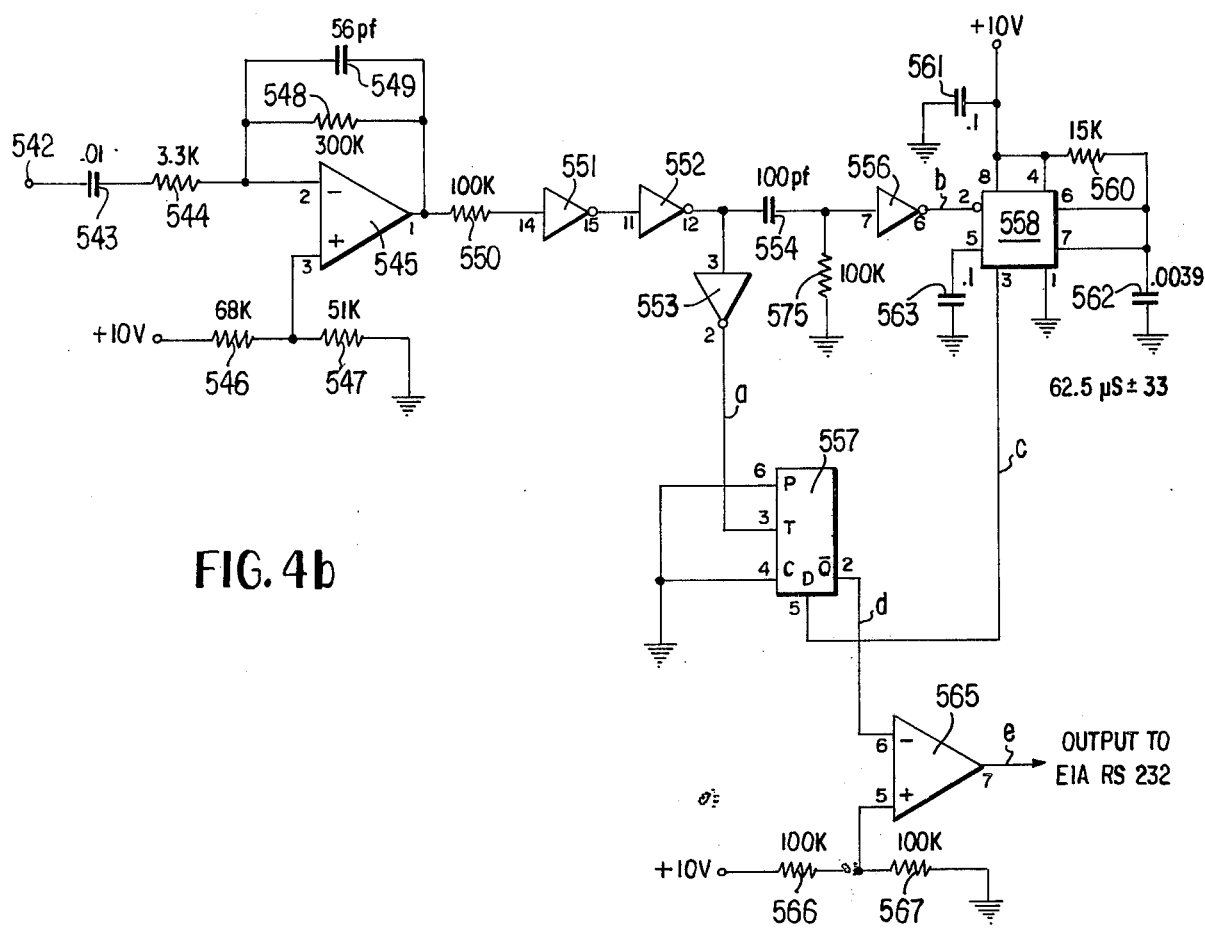

This signal is delivered to the intput 542 of the FM demodulator shown in FIG. 4b. This signal is conducted via a capacitor 543 and a resistor 544 to the inverting input of a differential amplifier 545 whose positive input is applied with a constant voltage by being connected to the center tap of a voltage divider 546, 547 which is connected between a constant d.c. voltage source constituting the circuit power supply and ground. The differential amplifier 545 is also provided with a feedback path composed of a parallel arrangement of a resistor 548 and a capacitor 549 connected between the output and the inverting input of the amplifier.

The output signal from amplifier 545 is conducted via a resistor 550 to a series arrangement of two inverters 551 and 552 and appears at the output of inverter 552 as a square wave varying in amplitude between 0 and +10 V and having a repetition rate of 6 KHz or 12 KHz. The output of inverter 552 is connected to the input of a further inverter 553 and to a pulse forming circuit composed of a series capacitor 554 and a shunt resistor 575 and connected to the input of a further inverter 556.

The output of inverter 553 is connected to the trigger input T of a dual D flip-flop 557, while the output of inverter 556 is connected to an inverting trigger input of a monostable multivibrator 558 whose signal output is connected to data input D of flip-flop 557.

Multivibrator 558 can be constituted by the same type of commercially available unit as timer 263 of FIG. 2d and connected to unit 558 are a biassing resistor 560 and capacitors 561, 562 and 563. Flip-flop 557 has its preset and clear inputs P and C both connected to ground.

The complement output Q of flip-flop 557 constitutes the output of demodulator 53 of FIG. 3 and is connected to the inverting input of a differential amplifier 565 forming the central component of an embodiment of the driver 55 of FIG. 3. The driver further includes a voltage divider 566, 567 connected between a d.c. voltage source and ground and having a center tap connected to the direct input of amplifier 565. The output from amplifier 565 is a signal having a value of −10 V for a binary bit value of "1" and +10 V for a binary bit value of "0".

In a practical embodiment of the circuit shown in FIGS. 4a and 4b, oscillator 520 could be a model OE-1 manufactured and sold by the International Crystal Manufacturing Co., Oklahoma City, Okla., ceramic filter 525 could be a model 5WF 10.7 MA manufactured and sold by the Murata Corporation of America, Elmsford, N.Y., differential amplifiers 545 and 565 could be constituted by a dual differential amplifier model MC 1458 C P1 manufactured and sold by Motorola Inc., Chicago, Ill., inverters 551, 552, 553 and 556 could be constituted by four of the inverter units contained in a model MC 14099 CP CMOS hex inverter manufactured and sold by Motorola, multivibrator 558 could be a model MC 1455 P1 timer manufactured by Motorola, and flip-flop 557 could be constituted by a model MC 14013 CP CMOS dual D flip-flop manufactured and sold by Motorola, as could the dual D flip-flops employed in the data adapter circuitry according to the present invention.

The numerals appearing adjacent the various terminals of the above-mentioned components shown in FIGS. 4a and 4b are the pin number designations provided by the manufacturers of the above-cited exemplary commercially available devices. When these devices are employed, all d.c. supply voltages have a value of +10 volts.

Figure 5:
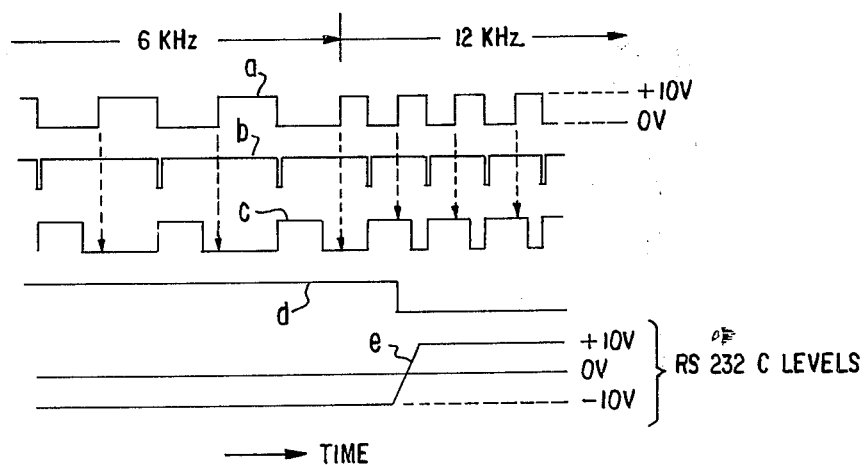
FIG. 5 is a diagram showing waveforms illustrating the operation of the circuit portion of FIG. 4b.

The operation of multivibrators 557 and 558 is depicted by the signal waveforms appearing in FIG. 5, where waveform a shows the output from inverter 553 just before and after the received signal varies from 6 KHz to 12 KHz. At the same time, the output from inverter 556 has the form shown by waveform b.

Each output pulse from inverter 556 triggers the production of a positive output pulse of fixed duration by multivibrator 558, the waveform of the resulting multivibrator output pulse being depicted by curve c. Whenever a positive voltage transition occurs at the output of inverter 553, the output state of flip-flop 557 will be set by the voltage then present at the output of multivibrator 558, at the instants indicated by the arrows associated with waveform c and corresponding to the positive transitions of waveform a.

Multivibrator 558 is set to cause the duration of each positive output pulse to be shorter than one-half the period of a 6 KHz pulse cycle but longer than one-half the period of a 12 KHz cycle and to cause each positive output pulse to be initiated in synchronism with each negative transition in the output inverter 553.

Thus, during each sequence of 6 KHz waves, a zero voltage level is present at input D of flip-flop 557 during each positive transition of waveform a and the flip-flop Q output presents a positive voltage, as shown by waveform d in FIG. 5. Conversely, during each sequence of 12 KHz waves, a positive, or binary "1", voltage is present at input D of flip-flop 557 during each positive transition of waveform a and the multivibrator $\overline{Q}$ output presents a zero voltage level.

The $\overline{Q}$ output of flip-flop 557 is then converted to the waveform e by amplifier 565 of FIG. 4b, providing the voltage levels required by an EIA (Electronic Industry Association) STD RS232C interface. The system can be associated with a commercially available printer manufactured and sold by National Cash Register Corporation.

It will be understood that the above description of the present invention is susceptible to various modifications, changes and adaptations, and the same are intended to be comprehended within the meaning and range of equivalents of the appended claims.

What is claimed is:

1. A system for placing a stream of data signals representing characters arranged for a television display into a format for acceptance by a communications printer for printing out of the data with a selected number of characters per line, comprising:

a data adapter member including: signal storage means composed of two memory units connected for receiving and temporarily storing successive portions of the stream of character data signals; output means; control signal generating means for generating signals required to instruct a communications printer to begin printing out a new line of characters; and control means connected to said memory units and generating means for causing successive data signal portions to be written into alternate ones of said memory units and to be read out from said memory units in alternation, each data signal stream portion being read out in successive segments to said output means, each segment containing signals representing such selected number of characters, and for supplying to said output means, during intervals between read out of successive segments, the signals required to instruct the printer to begin a new line of characters, said output means emitting signals corresponding to the signals supplied thereto; and a printer controller member connected to receive the signals emitted by said output means and to supply the information contained in those signals to a communications printer.

2. An arrangement as defined in claim 1 wherein said control means are arranged to permit read out from one memory unit to occur in time coincidence with write-in to the other memory unit.

3. An arrangement as defined in claim 1 wherein each character is defined by a multi-bit binary word and the stream of data signals delivered to said system is in the form of a carrier oscillation frequency modulated with the bits of such binary words.

4. An arrangement as defined in claim 3 wherein said data adapter member further comprises demodulator means connected for demodulating the data signals delivered to said system and for conducting the demodulated signals to said signal storage means, and said output means include modulator means connected for frequency modulating a carrier with the signals delivered to said output means.

5. An arrangement as defined in claim 4 wherein the modulating frequencies imposed on the carrier by said modulating means are different from the modulating frequencies of the modulated carrier oscillation delivered to said system.

6. An arrangement as defined in claim 1 in combination with a CATV installation including a main transmitting station, at least one subscriber location equipped with an electronically controllable printer, and a closed circuit signal transmission medium connecting said transmitting station to said location, and wherein said data adapter is located at said transmitting station and connected for applying the signals emitted by said output means to said transmission medium, and said printer controller member is connected to said transmission medium to receive the signals emitted by said output means.

7. An arrangement as defined in claim 6 wherein the stream of data signals delivered to said system are from a first information source and are time multiplexed with additional data signals from a second information source, and said data adapter member further comprises signal separating means connected for conducting to said signal storage means only the stream of data signals from the first information source.

8. An arrangement as defined in claim 6 further comprising means connected to deliver the signals arranged for a television display to said transmission medium for delivery to said subscriber location.

9. An arrangement as defined in claim 6 wherein each character is defined by a multi-bit binary word and the stream of data signals delivered to said system is in the form of a carrier oscillation frequency modulated with the bits of such binary words.

10. An arrangement as defined in claim 9 wherein said data adapter member further comprises demodulator means connected for demodulating the data signals delivered to said system and for conducting the demodulated signals to said signal storage means, and said output means include modulator means connected for frequency modulating a carrier with the signals delivered to said output means.

11. An arrangement as defined in claim 10 wherein the modulating frequencies imposed on the carrier by said modulating means are different from the modulating frequencies of the modulated carrier oscillation delivered to said system.

* * * * *